United States Patent [19]

Maissa

[11] Patent Number: 4,784,238
[45] Date of Patent: Nov. 15, 1988

[54] LARGE DIAMETER BOREHOLE APPARATUS

[75] Inventor: Jacques Maissa, Houston, Tex.

[73] Assignee: Western Atlas International, Inc., Houston, Tex.

[21] Appl. No.: 885,048

[22] Filed: Jul. 14, 1986

[51] Int. Cl.$^4$ ............................................... G01V 1/40
[52] U.S. Cl. .................................. 181/105; 367/911; 324/367; 166/212
[58] Field of Search ................. 367/35, 911; 181/102, 181/104, 105; 324/367; 73/151, 152; 33/304; 166/250, 254, 212

[56] References Cited

U.S. PATENT DOCUMENTS

| | | | |
|---|---|---|---|
| 4,117,394 | 9/1978 | Souhaité | 324/374 |
| 4,251,773 | 2/1981 | Cailliau et al. | 324/374 |
| 4,563,757 | 1/1986 | DeCorps et al. | 367/33 |
| 4,575,831 | 3/1986 | DeCorps et al. | 367/33 |
| 4,614,250 | 9/1986 | Panette et al. | 367/911 |
| 4,670,862 | 6/1987 | Staron et al. | 367/25 |
| 4,686,653 | 8/1987 | Staron et al. | 367/25 |

Primary Examiner—Thomas H. Tarcza
Assistant Examiner—Ian J. Lobo
Attorney, Agent, or Firm—Patrick H. McCollum

[57] ABSTRACT

Apparatus for positioning a detector at a plurality of depth locations within a large diameter borehole includes an elongated body member having a pair of diametrically opposed hydraulic pad displacement members mounted thereon. A pad mounting member is pivotally attached to each pad displacement member and a pair of borehole wall contacting members are pivotally attached to each pad mounting member. A signal detector is mounted behind one or more of the pad members. At each test depth a hydraulic power system deploys the pad displacement members from the body member to an extended position and extends the wall engaging pad members into contact with the borehole wall.

20 Claims, 2 Drawing Sheets

HYDRAULIC SCHEMATIC

LARGE DIAMETER BOREHOLE APPARATUS

BACKGROUND OF THE INVENTION

This invention relates to apparatus for use in a borehole traversing subsurface earth formations, and more particularly to apparatus for acquiring signals at different levels within a large diameter borehole.

The Vertical Seismic Profile (VSP) technique uses a combination of geophysical seismic and well logging techniques to obtain data. In addition to measuring the elapsed time for a surface-activated energy source pulse to travel to a subsurface geophone, the VSP technique records data beyond the first arrival of the propagating pulse and records all subsequent pulses as well. Because the VSP geophone is placed downhole rather than on the earth's surface, the VSP data images formation properties with greater detail than conventional seismic data.

In conducting a VSP operation, data must be collected by "anchoring" a geophone at a plurality of depth locations within a borehole. Once the instrument is anchored in position within a borehole tension is released from the cable and a seismic impulse is generated at or near the earth's surface. Related signals are detected at the geophone.

One apparatus for conducting the VSP operation is described in U.S. Pat. Nos. 4,563,757 and 4,575,831. This apparatus utilizes a sonde suspended in the borehole from a cable and having an anchoring pad. The pad is anchored to one side of the borehole wall to force the sonde into contact with the formation. While such an apparatus can be utilized in normal diameter boreholes, it is unsuitable for use in relatively large diameter boreholes, those in excess of approximately one (1) meter. In the large borehole environment an instrument of this design is not capable of exerting sufficient force on the pad member to prevent slippage of the sonde along the borehole wall when tension is removed from the cable.

Accordingly, the present invention overcomes the deficiencies of the prior art by providing apparatus for rigidly anchoring a detector at locations within a large diameter borehole.

SUMMARY OF THE INVENTION

Apparatus for positioning a detector at one or more depth positions against the wall of a large diameter borehole includes an elongated body member adapted to be positioned within the borehole. A pair of diametrically opposing pad displacement members are mounted on and extending from the pad displacement member. A pair of wall engaging pad members are pivotally attached to the pad carrier member. The piston is extendable from the pad displacement member to force each pad member into contact with the borehole wall. A signal detector mounts behind one or more of the pad members.

In case of hydraulic system failure an electrical safety system is provided which, when activated, retracts and lowers the pad displacement members. In case of electrical system failure an automatic timer activated safety system performs the function. Should both these safety systems be inoperative, the pad displacement members can be retracted and lowered by pulling a preselected tension on the cable suspending the instrument within the borehole.

DETAILED DESCRIPTION OF THE PREFERRED EMBODIMENT

Figure 1:
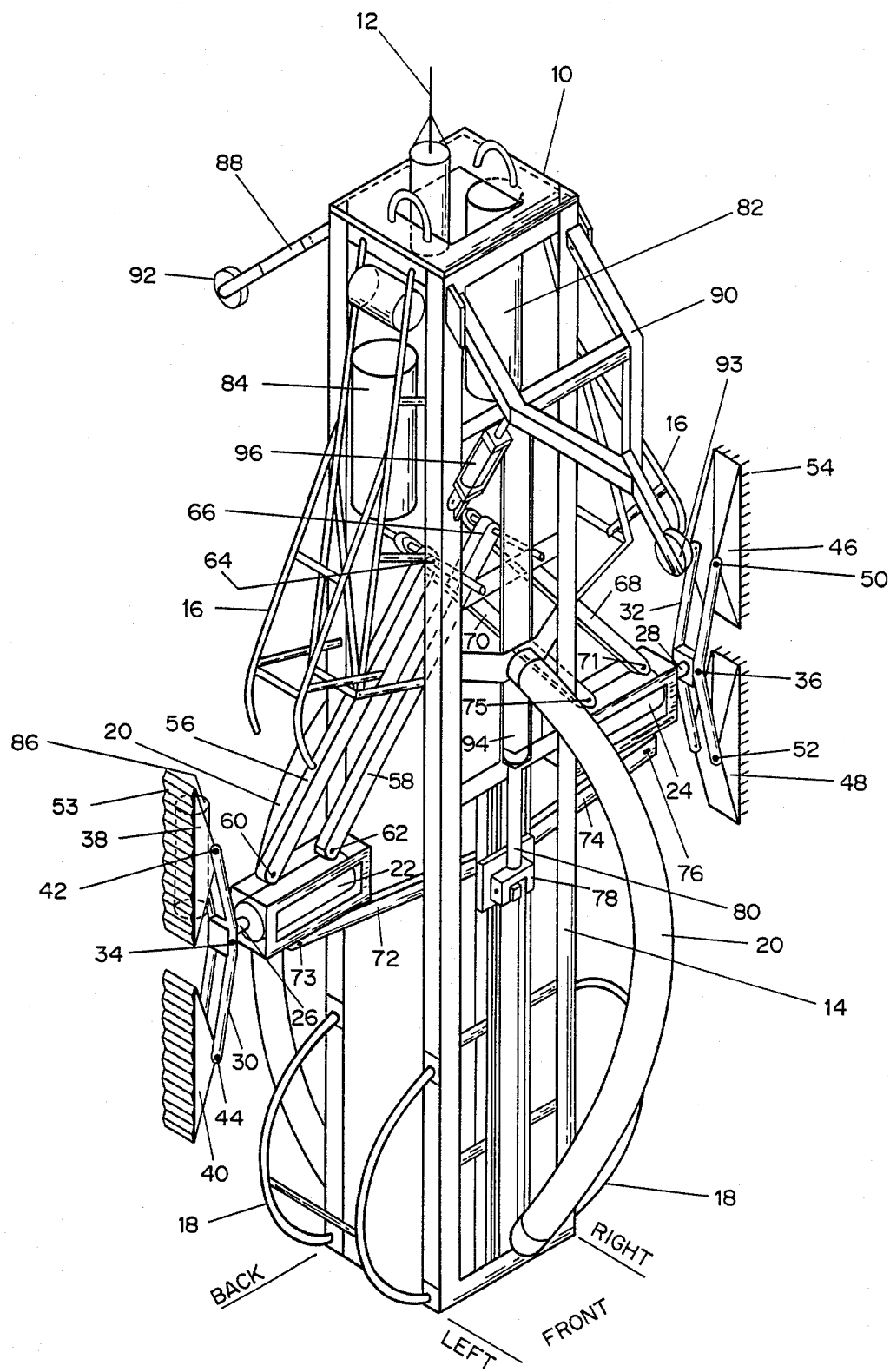
FIG. 1 is an isometric view of the instruments.

Referring now to the drawings in more detail, particularly to FIG. 1, there is illustrated instrument 10 which in operation is disposed at locations along an earth borehole (not shown) by means of cable or wireline 12 being wound on or unwound from a drum (not shown) located at the earth's surface. Instrument 10 includes a generally elongated body member 14 adapted to traverse the borehole. A plurality of upper rigid centralizer members 16 are attached to and extend outwardly from opposite sides of body member 14. A plurality of lower rigid centralizer members 18 are attached to and extend outwardly from the same opposite sides of body member 14 as upper centralizer member 16. In addition, a pair of flexible centralizer members 20 are attached to body member 14. Centralizer members 16, 18 and 20 serve to maintain instrument 10 in a generally centralized position along the longitudinal axis of the borehole.

Attached to body member 14 is the anchoring mechanism of the present invention. Anchoring mechanism includes a first and a second hydraulic powered pad displacement member, 22 and 24. Pistons 26 and 28 are extendable from and retractable into pad displacement members 22 and 24, respectively, under hydraulic fluid pressure control to be described later herein. Generally "V" shaped pad mounting members 30 and 32 are pivotally connected at the apex 34 and 36, respectively, to pistons 26 and 28. A pair of wall engaging pad members 38 and 40 are pivotally connected at 42 and 44 to pad mounting member 30 and a pair of wall engaging pad members 46 and 48 are pivotally connected 50 and 52 to pad mounting member 32, Each pad mounting member 30 and 32 can pivot approximately fifteen degrees in the vertical plane. Each pad member 38, 40, 46 and 48 can pivot on pad mounting members 30 and 32 approximately ten degrees in the same vertical plane. Affixed to the face of each pad members 46 and 48 are plurality of pointed projections, illustrated at 54, to provide penetration into the borehole wall when pad members 46 and 48 are engaged therewith. Pad members 38 and 40 are equipped with a plurality of ridged projections 53 on the wall engaging force thereof.

Pad displacement member 22 is coupled to body member 14 by a set of linkage arms 56 and 58 pivotally connected to pad displacement member 22 at 60 and 62. Linkage arms 56 and 58 are articulated at 64 and 66, respectively, to body member 14 and are at least substantially parallel. Pad displacement member 24 is coupled to body member 14 by a set of linkage arms 68 and 70 pivotally connected to pad displacement member 24 at 71 and 75. Linkage arms 68 and 70 are articulated at 66 and 64, respectively, to body member 14 and are at least substantially parallel. It should be recognized that linkage arm pairs 56 and 58, and 68 and 70 will maintain the longitudinal axis of pad displacement members 22 and 24 substantially perpendicular to the longitudinal axis of body member 14, or in other words in a generally horizontal plane.

In order that pad displacement members 22 and 24 can be deployed from a first position within body member 14 to an extended position outside body member 14, linkage arm 72 is pivotally connected at 73 to pad displacement member 22 and linkage arm 74 is pivotally connected at 76 to pad displacement member 24. The other end of linkage arms 72 and 74 are coupled at lift arbor 78 to actuating rod 80. Rod 80 functions as a piston member for lift/lower power member 94 and moves in translation to the longitudinal axis of body member 14 in response to hydraulic fluid pressure at lift/lower point member 94, a process which will be described in greater detail herein, causing lift arbor 78 to move longitudinally on body member 14, further causing pad displacement members 22 and 26 to be extended outwardly from and retracted into body member 14.

Pivotally connected to body member 14 adjacent to the proximal end thereof are a pair of hydraulic powered stabilizer arms 88 and 90. Arms 88 and 90 include a wheel portion 92 and 93, respectively, at the borehole wall engaging end thereof.

Retained within body member 14 is a hydraulic power system 82 coupled by hydraulic lines to pad displacement members 22 and 24, lift/lower power member 94, and stabilizer displacement members 96. Also retained within body member 14 is subsurface electronics 84, including the required power supplies and amplifiers necessary for operation of the instrument. Mounted to the back side of one wall engaging pad member, for example 38, is a signal detector section 86 which is connected to subsurface electronics 84. Detector section 86 comprises a geophone. In the preferred embodiment six geophones connected in parallel comprise detector section 86.

Figure 2:
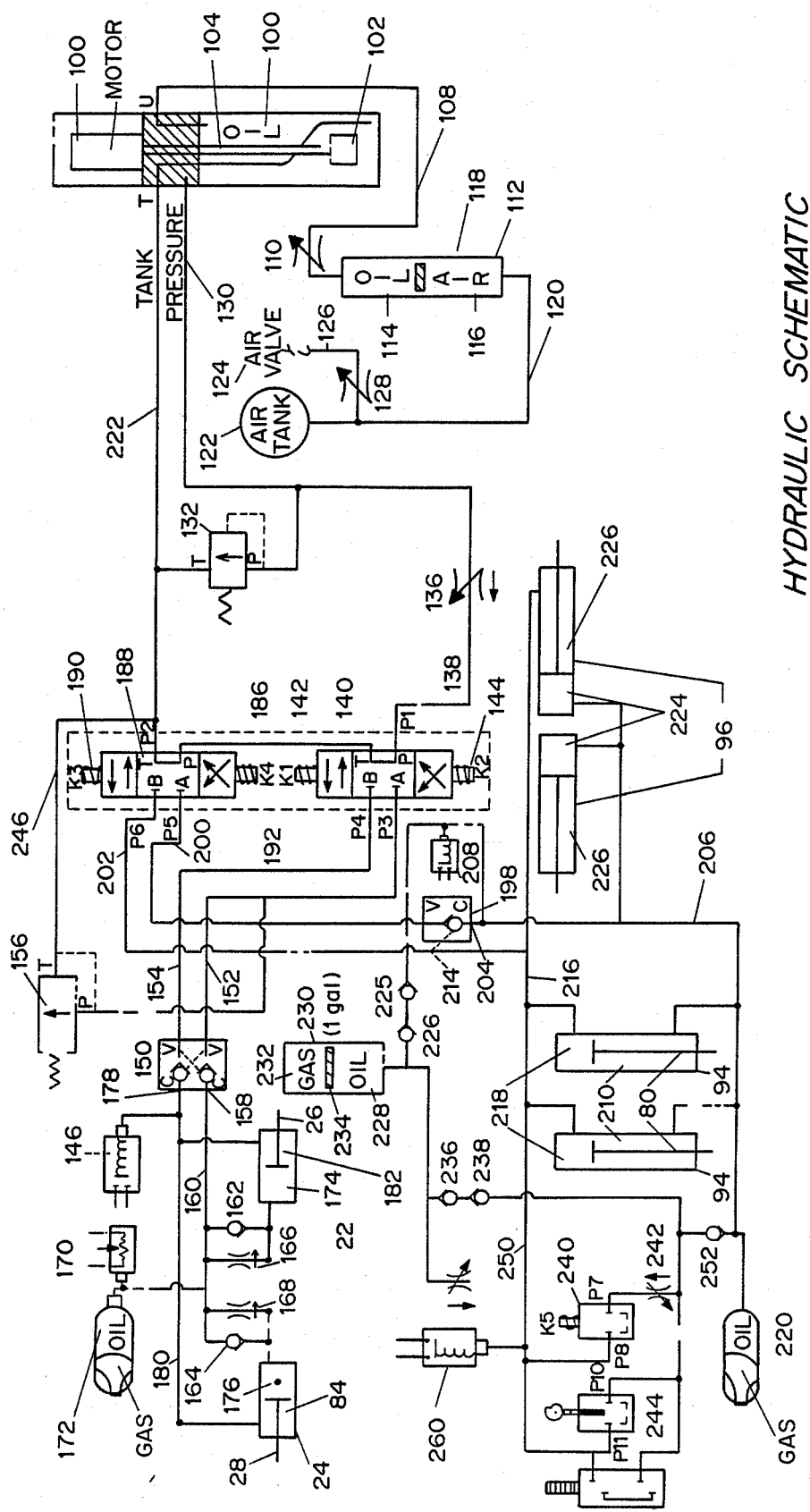
FIG. 2 is a schematic representation of the hydraulic power system used in the instrument.

Referring now to FIG. 2, there is illustrated in schematic form the hydraulic power system of the present invention. The hydraulic power system includes a fluid reservoir 100, containing a hydraulic fluid such as oil or the like. Disposed within reservoir 100 is hydraulic pump 102 which is coupled through shaft 104 to electric motor 106. Reservoir is fluidly connected through hydraulic line 108 and flow control valve 110 to pressure chamber 112. Pressure chamber 112 comprises a first hydraulic fluid reservoir 114 and a second air chamber 116 isolated by piston 118. Air chamber 116 is connected by line 120 to air tank 122. Air valve 124 is connected through line 126 and control valve 128 to line 120. Air tank 122, air valve 124, control valve 128 and pressure chamber 112 function to maintain the fluid level within reservoir 100.

The output of pump 102 is connected through hydraulic line 130 to pressure relief valve 132 and flow control valve 136. The other side of flow control valve 136 is connected through line 138 to port P1 of four-way valve 140. Four-way valve 140 is an electrically controlled flow valve operated by lock solenoid 142 and retract solenoid 144. Ports P3 and P4 of valve 140 are coupled to pilot control check valve 150 by lines 152 and 154, respectively. In addition, line 152 connects to pressure relief valve 156.

Output 158 of pilot control check valve 150 connects by line 160 to pilot check valves 162 and 164, flow control valves 166 and 168, pressure transducer 170 and accumulator 172. The other side of valves 162 and 166 connects to chamber 174 of pad displacement member 22. The other side of valves 164 and 168 connects to chamber 176 of pad displacement member 24. Output 178 of pilot control check valve 150 connects by line 180 to chamber 182 of pad displacement member 22 and to chamber 184 of pad displacement member 24 and to pressure switch 146.

Port P1 of four-way valve 140 also connects through line 186 to port P2, of four-way valve 188. Four-way valve 188 is electrically controlled by lift solenoid 190 and lower solenoid 192. Ports P5 and P6 are connected to pilot valve 198 by lines 200 and 202, respectively. Output 204 of pilot check valve 198 connects by line 206 to pressure switch 208, chambers 210 of lift/lower power member 94, accumulator 220 and chambers 224 of stabilizer displacement members 96. Pressure switch 208 connects through pilot check 225 and 226 to chamber 228 in reservoir 230. Chamber 228 is precharged with hydraulic fluid and is isolated from gas chamber 232 by isolation piston 234. Chamber 228 connects through pilot check valves 236 and 238 to solenoid valve 240, through flow control valve 242; to mechanical clock valve 244, mechanical slide valve 248, and to pilot check valve 252.

Output 214 of pilot check valve 198 connects by line 216 to chambers 218 of lift/lower power members 94 and chambers 226 of stabilizer displacement members 96. Chambers 218 and 226 connect through line 250 to switch 260, and the outputs of solenoid valve 240, clock valve 244 and slide valve 248.

Port P2 of four-way valve 188 also connects through line 246 to pressure relief valve 156 and through line 222 to pressure relief valve 132 and fluid reservoir 100.

In the operation of anchoring detector 86 to the borehole wall, instrument 10 is placed in position within the borehole. The "LIFT" function is selected at the surface control system and electrical power is applied to motor 106 through wireline 12. Selection of the "LIFT" function causes lift solenoid 190 to shift four-way valve 188 making fluid connection between input port P1 and output port P5. Motor 106 causes pump 102 to force pressurized hydraulic fluid from reservoir 100 through line 130, 138 and 186 to four-way valve 188, line 200, pilot control check valve 198 and into chambers 210 of lift/lower power members 94 and chambers 224 of stabilizer displacement members 96. Pump 102 is capable of flow of 2 liters per minute at a pressure of 1500 psi. Thus, stabilizers 88 and 90 are shifted into engagement with the borehole wall and rod 80 is moved upward on body member 14. The movement of rod 80 causes left arbor 78 to move pad displacement members 22 and 24, through linkage arms 72 and 74, from within body member 14 to an extended position. In the preferred embodiment linkage arms 72 and 74 are selected to position pad members 38, 40, 46 and 48 within approximately two inches from the borehole wall when pad displacement members 22 and 24 are in an extended position.

To set pad members 38, 40, 46 and 48 the "LOCK" mode is selected and lock solenoid 142 is activated allowing fluid communication to be made within four-way valve 140 from port P1 to port P3. Thus, hydraulic fluid pressure passes through pilot control check valve 178 and flow control valve 166 and 168 into chambers 174 and 176 of pad displacement members 22 and 24 forcing pistons 26 and 28 outwardly until pads 38, 40, 46 and 48 engage the borehole wall. This anchors detector 86 into position adjacent the formation. With detector 86 anchored into position tension is released from cable 12 allowing instrument 10 to receive seismic signals. Given the pump operating pressure and the dimension of each piston 26 and 28 approximately 18,000 pounds of force is developed by pad displacement members 22 and 24. With each pad member having approximately 132 square inches of borehole wall contact force approximately 68 pounds per square inch of pressure is on the pad face.

Once seismic operations are complete at a depth location instrument 10 must be moved to a different location within the borehole, thus the "RETRACT" mode is selected. Retract solenoid 144 is energized shifting four-way valve 140, allowing hydraulic fluid to pass from port P1 to port P4. Hydraulic fluid passes through line 154, pilot check valves 150 to chambers 182 and 184 of pad displacement members 22 and 24 retracting pad members 38, 40, 46 and 48. Hydraulic fluid in chambers 174 and 176 is moved back into reservoir 100 via check valve 162 and 164, pilot check valve 150, port P3 and port P2 and line 222.

With pad members 38, 40, 46 and 48 retracted pad displacement members 22 and 24 can be lowered into body member 14 by selection of the "LOWER" mode. Solenoid 192 is energized shifting four-way valve 188 allowing hydraulic fluid to pass from port P1 to port P6 of valve 188 through pilot control check valve 198 to chambers 218 of left/lower power member 94. Fluid is forced from chambers 210 to reservoir 100 through control check valve 198 to port P5 to reservoir 100 through port P2 and line 222. In addition, hydraulic fluid passes along the same path from chambers 224 of stabilizer displacement members 96 allowing stabilizer 88 and 90 to retract.

Instrument 10 is equipped with a redundant safety system for use in the event it becomes impossible to activate the tool on the "RETRACT" and "LOWER" function once pads 38, 40, 46 and 48 are locked against the borehole wall. Solenoid valve 240 is activated allowing hydraulic fluid to flow between ports P7 and P8. Pressurized fluid from chamber 228 flows through check valves 236 and 238 through flow control valve 242 to valve 240. Hydraulic fluid also flows from chambers 210 of lift/lower power member 94 to chambers 218 and from chambers 224 of stabilizer displacement members 96 to chambers 226 by way of solenoid valve 240, allowing stabilizer 88 and 90 to retract and lower left/lower power member 94 to retract pad displacement members 22 and 24 away from the borehole wall.

In the instance of an electrical malfunction the safety retraction function is performed by mechanical clock valve 244. Clock valve 244 is set before instrument 10 is lowered into the borehole to activate after a predetermined delay period, for example twenty-four hours. After the pre selected delay period clock valve 244 will activate allowing fluid flow therethrough. Thereafter, hydraulic fluid flow will occur as described in connection with solenoid valve 240.

Should solenoid valve 240 be inoperative and clock valve 244 malfunction the release function is performed by mechanical slide valve 248. Valve 248 is activated by pulling a preselected amount of tension with cable 12. For example, pulling approximately 16,000 pounds of tension through cable 12 will cause slide valve 248 to establish fluid communication therethrough allowing pad displacement members 22 and 24 to retract as previously described.

Many modifications and variations beside those specifically mentioned may be made without departing substantially from the concept of the present invention. Accordingly, it should be clearly understood that the forms of the invention described and illustrated herein are exemplary only and are not intended as limitations on the scope of the present invention.

The embodiments of the invention in which an exclusive property or privilege is claimed are defined as follows:

1. Apparatus for placing a signal detector in a stationary position adjacent the wall of a borehole traversing a subsurface with earth formation, comprising:
    an elongated body member adapted for suspension within a borehole;
    first and second diametrically opposed displacement members cooperatively arranged on said body member;
    first and second pairs of wall engaging pad members, coupled to said first and second displacement member, said pad members being anchored to said borehole wall;
    a signal detector mounted to at least one of said pad members; and
    hydraulic power means for deploying said pad members into contact with the wall of said borehole and placing said signal detector in a stationary position adjacent said wall of said borehole.

2. The apparatus of claim 1, further comprising means for deploying said displacement members from a first position at least partially within said body member to a second position outside said body member.

3. The apparatus of claim 2, wherein said means for deploying said displacement members further comprises:
    a first pair of substantially parallel arm members pivotally connected at a first end to said first displacement member and pivotally connected at a second end to first and second locations on said body member; and
    a second pair of substantially parallel arm members pivotally connected at a first end to said second displacement member, and pivotally connected at a second end to said first and second locations on said body member.

4. The apparatus of claim 3, wherein said means for deploying said displacement members further comprises:
    a first lift arm pivotally connected at a first end to said first displacement member;
    a second lift arm pivotally connected at a first end to said second displacement member; and
    means connected to a second end of said first and second lift arms for deploying said displacement members from a position within said body member to an extended position.

5. Apparatus for positioning a signal detector at a location adjacent the wall of a borehole traversing a subsurface earth formation, comprising:
    an elongated body member adapted for suspension within a borehole;
    first and second diametrically opposed displacement members cooperatively arranged on said body member;
    first and second pairs of wall engaging pad members coupled to said first and second displacement members;
    a signal detector mounted to at least one of said pad members;
    hydraulic power means for deploying said pad members into contract with the wall of said borehole;
    a first piston member extending from said first displacement member;

a second piston member extending from said second displacement member; and first and second pad carrier members pivotally connected to said first and second piston members, respectively.

6. The apparatus of claim 1, further comprises a pair of hydraulically powered, wall engaging stabilizer members connected to the proximal end of said body member.

7. Apparatus for placing a signal detector in a substantially stationary position adjacent the wall of a borehole traversing a subsurface with earth formation, comprising an elongated body member adapted for suspension within a borehole;

first and second diametrically opposed displacement members cooperatively arranged on said body member;

first and second pairs of wall engaging pad members, coupled to said first and second displacement members, said pad members being anchored to said borehole wall;

a signal detector mounted to at least one of said pad members; and hydraulic power means for deploying said pad members into contact with the wall of said borehole wherein said hydraulic power means further comprises safety means for retracting said pad members from contact with said wall of said borehole in case of hydraulic failure.

8. The apparatus of claim 7, wherein said safety means further comprises an electrically controlled release valve.

9. The apparatus of claim 7, wherein said safety means further comprises a time delay release valve.

10. The apparatus of claim 7, wherein said safety means further comprises a mechanically controlled release valve.

11. Apparatus for anchoring a seismic detector carrier to the wall of a borehole, comprising:

an elongated body member adapted to be suspended within a borehole by a cable;

first and second hydraulic powered, diametrically opposed displacement members cooperatively arranged on said body member;

first and second piston members extendable from said first and second displacement members, respectively;

first and second wall engaging pad pairs, coupled to said first and second piston members, to immovably brace said body member against said borehole wall;

a seismic detector mounted to at least one of said pad members; and a hydraulic power system coupled to said displacement members.

12. The apparatus of claim 11, further comprising hydraulic power means coupled to said hydraulic system for deploying said displacement members from a retracted position within said body member to an extended position.

13. The apparatus of claim 12, further comprising a safety system for retracting said displacement members.

14. The apparatus of claim 13, wherein said safety system further comprises an electrically controlled safety valve.

15. The apparatus of claim 14, wherein said safety system further comprises a time delay controlled safety valve in parallel with said electrically controlled safety valve.

16. The apparatus of claim 15, wherein said safety system further comprises a mechanically controlled safety valve in parallel with said electrically controlled safety valve.

17. The apparatus of claim 16, wherein said mechanically controlled safety valve is actuated by pulling tension on said cable.

18. The apparatus of claim 12 further comprising:

first and second substantially parallel arm members coupled between said first displacement member and said body member; and third and fourth substantially parallel arm members coupled between said second displacement member and said body member.

19. The apparatus of claim 18 further comprising:

a hydraulic powered means for deploying said first and second displacement members; and fifth and sixth arm members coupled between said displacement members and said hydraulic powered deploying means.

20. The apparatus of claim 19, wherein the longitudinal axis of said displacement members is maintained substantially perpendicular to the longitudinal axis of said body member during deployment.

* * * * *